(12) United States Patent
Yang et al.

(10) Patent No.: US 11,474,781 B2
(45) Date of Patent: Oct. 18, 2022

(54) ELECTRONIC BOOK SYSTEM USING ELECTROMAGNETIC ENERGY TO DETECT PAGE NUMBERS

(71) Applicants: Chun-Hsiang Yang, Taoyuan (TW); Hung-Wang Hsu, Taoyuan (TW)

(72) Inventors: Chun-Hsiang Yang, Taoyuan (TW); Hung-Wang Hsu, Taoyuan (TW)

(73) Assignee: ASIANLINK TECHNOLOGY INCORPORATION, Taoyuan (TW)

( * ) Notice: Subject to any disclaimer, the term of this patent is extended or adjusted under 35 U.S.C. 154(b) by 97 days.

(21) Appl. No.: 16/898,153

(22) Filed: Jun. 10, 2020

(65) Prior Publication Data

US 2021/0389927 A1 Dec. 16, 2021

(51) Int. Cl.
| | | |
|---|---|---|
| *B42D 3/12* | (2006.01) | |
| *G09B 21/00* | (2006.01) | |
| *G09B 5/06* | (2006.01) | |
| *G06F 3/16* | (2006.01) | |
| *G06K 7/08* | (2006.01) | |
| *G06K 9/00* | (2022.01) | |

(52) U.S. Cl.
CPC ............. *G06F 3/167* (2013.01); *B42D 3/123* (2013.01); *G06K 7/081* (2013.01); *G06K 9/00* (2013.01); *G09B 5/062* (2013.01); *G09B 21/006* (2013.01)

(58) Field of Classification Search
CPC ...... G09B 21/006; G09B 5/062; G06K 7/081; G06K 9/00; G06F 3/167; B42D 3/123
See application file for complete search history.

(56) References Cited

U.S. PATENT DOCUMENTS

| | | | | |
|---|---|---|---|---|
| 3,614,756 A | * | 10/1971 | McIntosh | G05D 3/20 |
| 4,425,098 A | * | 1/1984 | Doring | G11B 33/06 281/38 |
| 4,809,246 A | * | 2/1989 | Jeng | H03M 7/008 D19/27 |
| 5,191,329 A | * | 3/1993 | Samreus | G06F 3/045 341/20 |
| 6,262,662 B1 | * | 7/2001 | Back | G06K 7/0008 340/8.1 |
| 6,294,997 B1 | * | 9/2001 | Paratore | G06K 19/0723 340/540 |
| 6,720,866 B1 | * | 4/2004 | Sorrells | G06K 19/0717 340/10.41 |

(Continued)

*Primary Examiner* — Daniel I Walsh
(74) *Attorney, Agent, or Firm* — Che-Yang Chen; Law Office of Michael Chen

(57) ABSTRACT

An electronic book using electromagnetic energy to detect page numbers includes a book and a base, the book includes a plurality of book pages, each of the book pages is respectively provided with an electromagnetic energy changing member, and the base is provided with at least one antenna coil and at least one control circuit. The electromagnetic energy changing member of each of the book pages is correspondingly disposed adjacent to a position of the antenna coil, and a magnetic flux generated by the antenna coil is transmitted to the electromagnetic energy changing members. The electromagnetic energy changing members generate magnetic variable fluxes to be received by the antenna coil for generating a page number prompt output command by conversion to control generation of a prompt function of the book page correspondingly disposed adjacent to the position of the antenna coil.

5 Claims, 18 Drawing Sheets

(56) References Cited

U.S. PATENT DOCUMENTS

| | | | | |
|---|---|---|---|---|
| 6,915,103 B2* | 7/2005 | Blume | G06F 3/03545 | 345/173 |
| 7,120,385 B2* | 10/2006 | Marggraff | G09B 7/00 | 434/317 |
| 7,201,317 B2* | 4/2007 | Song | G06F 3/0224 | 434/317 |
| 7,336,179 B2* | 2/2008 | Kashiwase | G01S 5/0009 | 340/572.1 |
| 7,402,042 B2* | 7/2008 | Kelley | G09B 5/02 | 434/167 |
| 7,511,585 B2* | 3/2009 | Lin | G09B 5/062 | 324/656 |
| 8,306,489 B2* | 11/2012 | Schwarzmueller | H01Q 7/00 | 455/193.1 |
| 9,048,815 B2* | 6/2015 | Ho | H03H 7/38 | |
| 9,569,977 B2* | 2/2017 | Binyamin | G09B 5/062 | |
| 9,760,254 B1* | 9/2017 | Donnelley | G06F 40/131 | |
| 10,043,407 B2* | 8/2018 | Murdock | G06F 3/167 | |
| 10,086,636 B1* | 10/2018 | Vielma Diaz | B42D 1/008 | |
| 10,127,823 B2* | 11/2018 | Lo | G09B 5/062 | |
| 10,133,890 B2* | 11/2018 | Ashwood-Smith | G06K 19/07372 | |
| 10,154,649 B2* | 12/2018 | Hill | A01K 11/006 | |
| 10,358,914 B2* | 7/2019 | Roberson | E21B 47/005 | |
| 10,459,584 B2* | 10/2019 | Hsu | A63F 9/00 | |
| 10,572,075 B2* | 2/2020 | Hsu | G06F 3/0416 | |
| 11,030,426 B2* | 6/2021 | Yang | G06K 19/07777 | |
| 11,132,593 B2* | 9/2021 | Ueki | G06K 19/07758 | |
| 11,301,800 B1* | 4/2022 | Bhagwat | H04W 4/021 | |
| 2001/0011878 A1* | 8/2001 | Heese | H02P 25/0925 | 318/701 |
| 2001/0051329 A1* | 12/2001 | Lynch | G06F 3/0224 | 434/317 |
| 2003/0116620 A1* | 6/2003 | Song | G09B 5/062 | 235/375 |
| 2003/0175672 A1* | 9/2003 | Kim | G09B 5/06 | 434/169 |
| 2004/0023192 A1* | 2/2004 | Lee | G09B 5/062 | 434/156 |
| 2005/0095568 A1* | 5/2005 | Musolf | G09B 5/06 | 434/308 |
| 2005/0100874 A1* | 5/2005 | Arkush | B42D 3/123 | 434/317 |
| 2006/0104012 A1* | 5/2006 | Hsieh | G06F 3/03545 | 361/679.01 |
| 2007/0096910 A1* | 5/2007 | Waters | G06K 19/07749 | 257/E23.092 |
| 2007/0205840 A1* | 9/2007 | Lin | H03K 17/972 | 331/167 |
| 2008/0268415 A1* | 10/2008 | Kwong | G09B 5/062 | 434/317 |
| 2009/0021318 A1* | 1/2009 | Lin | G09B 5/062 | 434/317 |
| 2009/0033468 A1* | 2/2009 | Kato | G06K 7/10336 | 340/10.1 |
| 2009/0108992 A1* | 4/2009 | Shafer | H04L 69/08 | 340/10.1 |
| 2009/0191531 A1* | 7/2009 | Saccocci | G09B 5/062 | 600/26 |
| 2010/0328922 A1* | 12/2010 | Peters | B42D 25/24 | 361/816 |
| 2011/0059426 A1* | 3/2011 | Mamigonians | G09B 5/062 | 434/317 |
| 2013/0002543 A1* | 1/2013 | Yau | G09B 5/10 | 345/156 |
| 2013/0278378 A1* | 10/2013 | Hoegerl | G06K 19/07773 | 235/492 |
| 2014/0298062 A1* | 10/2014 | Lee | G06F 1/1626 | 713/323 |
| 2015/0007092 A1* | 1/2015 | Park | G06F 3/04883 | 715/776 |
| 2016/0070366 A1* | 3/2016 | Pinheiro De Figueiredo | G06F 3/0346 | 345/156 |
| 2016/0147314 A1* | 5/2016 | Bujsaim | G06F 15/0291 | 345/173 |
| 2016/0188197 A1* | 6/2016 | Ryu | G06F 1/1692 | 345/156 |
| 2016/0274696 A1* | 9/2016 | Hsu | G06F 3/044 | |
| 2016/0328637 A1* | 11/2016 | Viikari | G06K 19/0717 | |
| 2016/0343264 A1* | 11/2016 | Murdock | G06F 3/167 | |
| 2017/0364718 A1* | 12/2017 | Finke | G06K 7/10336 | |
| 2018/0129278 A1* | 5/2018 | Luchinskiy | G06F 3/0483 | |
| 2018/0329872 A1* | 11/2018 | Liu | G06F 40/114 | |
| 2018/0336790 A1* | 11/2018 | Lam | G09B 5/062 | |
| 2019/0232705 A1* | 8/2019 | Chen | G06F 3/044 | |
| 2019/0250732 A1* | 8/2019 | Hsu | H03K 17/9622 | |
| 2020/0019805 A1* | 1/2020 | Chen | G06V 10/235 | |
| 2020/0042146 A1* | 2/2020 | Chen | G06F 15/0291 | |
| 2020/0276852 A1* | 9/2020 | DeVeaux | G09B 5/06 | |
| 2020/0293266 A1* | 9/2020 | German | G09B 5/06 | |
| 2020/0362384 A1* | 11/2020 | Chen | G01N 27/4146 | |
| 2020/0390674 A1* | 12/2020 | Bonnamy | A61K 8/498 | |
| 2021/0073488 A1* | 3/2021 | Turner | G06K 7/10366 | |
| 2021/0109053 A1* | 4/2021 | Shiraki | G06K 19/07773 | |
| 2021/0124883 A1* | 4/2021 | Yang | G01R 27/00 | |
| 2021/0182510 A1* | 6/2021 | Mear | G06K 19/07327 | |
| 2021/0346264 A1* | 11/2021 | Denda | A61Q 19/10 | |
| 2021/0389927 A1* | 12/2021 | Yang | G06F 3/167 | |

* cited by examiner

ELECTRONIC BOOK SYSTEM USING ELECTROMAGNETIC ENERGY TO DETECT PAGE NUMBERS

BACKGROUND OF THE INVENTION

Field of Invention

The present invention relates to an electronic book, and more particularly to an electronic book using electromagnetic energy to detect page numbers capable of effectively reducing the manufacturing costs and avoiding the danger of using magnets.

Related Art

With the advent of the digital technology era, many electronic and electrical products are also designed to feature the digital image mode. In addition to electronic and electrical products, some audio books such as story books and teaching books also use sound transmitting mode to help readers to improve understanding of the book contents. Especially for young children and visually impaired people, the development of audio books provides great fun and convenience for young children and visually impaired readers in reading books. Currently there are audio books on the market that mainly use the method of light sensor or magnet sensing for page number detection. The existing audio book structure is mainly provided with apertures in the book pages, and a plurality of light sensors arranged under the apertures, and a quantity of the apertures is sequentially increased according to each of the pages. With the apertures and the light sensors, when the book pages are turned, light beam can pass through the different quantities of the apertures of each of the pages to actuate the different quantities of the light sensors, and sound data of the page that is previously set is sent out, so that the reader can hear the sound while reading the book. But the cost of using light sensor is high, and the design of the light-transmitting structure also needs to be quite precise to avoid the problem of light leakage. For sensing of page numbers in the existing smart electronic audio book, because a quantity of electric charge of the page number sensor is close to the noise in the environmental space, the capacitive sensor cannot effectively detect it as noise or the page number sensor. For the existing smart electronic audio book capable of effectively detecting page numbers, a method for increasing a quantity of electric charge of the page number sensor is disclosed. In addition, embedding of magnet in the book page and application of the Hall IC sensing method are also disclosed to make sure the page number can be detected every time. However, the cost of Hall IC is high, the more the quantity of book pages, the higher the quantity of Hall ICs, resulting in increased manufacturing costs. Moreover, in order to embed a magnet in the book page, it is required to dispose the magnet between two pieces of paper, such processing method can only be done by manually positioning the magnet at an appropriate position, and then the pieces of paper are bonded. In addition to the processing being very time-consuming and labor-intensive, when children are using the book, the magnet can be easily removed and the children can swallow the magnet accidentally. Therefore, the method of applying the magnet is relatively dangerous in usage.

Therefore, how to solve the above problems and drawbacks in the prior art is what the inventor of the present invention and relevant manufacturers engaged in this industry are eager to research and make improvement.

SUMMARY OF THE INVENTION

Therefore, in order to effectively solve the above-mentioned problems, a main object of the present invention is to provide an electronic book using electromagnetic energy to detect page numbers capable of effectively reducing the manufacturing costs and avoiding the danger of using magnets.

In order to achieve the above object, the present invention provides an electronic book using electromagnetic energy to detect page numbers, which includes a book and a base, wherein the book includes a plurality of book pages, each of the book pages is respectively provided with an electromagnetic energy changing member, and the base is provided with at least one antenna coil and at least one control circuit. The control circuit has an LC oscillation unit, a receiving unit, a central processing unit, a prompt signal generating unit and a power supply unit. The electromagnetic energy changing member of each of the book pages is correspondingly disposed adjacent to a position of the antenna coil, the LC oscillation unit generates resonance to cause the antenna coil to generate a magnetic flux, and the magnetic flux of the antenna coil is transmitted to the electromagnetic energy changing members disposed adjacent to the position of the antenna coil. The electromagnetic energy changing members generate magnetic variable fluxes and the magnetic variable fluxes are transmitted through the antenna coil to the receiving unit. The receiving unit receives the magnetic variable fluxes and decodes the magnetic variable fluxes to generate a magnetic induction signal, and the receiving unit transmits the magnetic induction signal to the central processing unit. The central processing unit compares the magnetic induction signal and converts the magnetic induction signal into a page number prompt output command, and through the page number prompt output command the central processing unit controls the prompt signal generating unit to generate a prompt function of the book page correspondingly disposed adjacent to the position of the antenna coil, thereby achieving efficacies of reducing the overall manufacturing costs and avoiding the disadvantages of using magnets while having favorable page number sensing function.

According to the electronic book of the present invention, wherein the central processing unit has a plurality of set flux values, the central processing unit compares the magnetic induction signal with the set flux values to generate the page number prompt output command, and through the page number prompt output command the central processing unit controls the prompt signal generating unit to generate the prompt function of the book page correspondingly disposed adjacent to the position of the antenna coil.

According to the electronic book of the present invention, wherein the central processing unit stores a page number prompt database, the page number prompt database has page number prompt data corresponding to each of the book pages, the central processing unit receives the magnetic induction signal while captures the page number prompt data corresponding to the book page according to the magnetic variable flux, and through the page number prompt output command the central processing unit controls the prompt signal generating unit to generate the page number prompt data of the book page correspondingly disposed adjacent to the position of the antenna coil.

According to the electronic book of the present invention, wherein the control circuit is further provided with a wireless transmission unit, the wireless transmission unit is electrically connected to the central processing unit, and the wireless transmission unit can be various types of remote control transmitters.

According to the electronic book of the present invention, wherein the electromagnetic energy changing member is a metal plate, a material of the metal plate is copper, gold, silver, aluminum or other suitable metal materials, and the electromagnetic energy changing member can be attached to a surface of the book page or embedded in the book page.

According to the electronic book of the present invention, wherein the electromagnetic energy changing member is an LC resonance module, the LC resonance module is a resonance circuit module including an inductor and a capacitor, and the electromagnetic energy changing member can be attached to the surface of the book page or embedded in the book page.

According to the electronic book of the present invention, wherein each of the electromagnetic energy changing members is a metal plate and disposed at a same corresponding position of each of the book pages. The base is provided with the single antenna coil, a disposing area of the single antenna coil is larger than an area of the electromagnetic energy changing member, a disposing position of the electromagnetic energy changing member of each of the book pages is equivalent to a disposing position of the single antenna coil of the base and reflects the magnetic flux to generate the magnetic variable flux. Alternatively, each of the electromagnetic energy changing members is a metal plate and disposed at a different corresponding position of each of the book pages, the base is provided with the single antenna coil, a disposing area of the single antenna coil is larger than an accumulative area of the electromagnetic energy changing members, and a disposing position of the electromagnetic energy changing member of each of the book pages is equivalent to a disposing position of the single antenna coil of the base and reflects the magnetic flux to generate the magnetic variable flux.

According to the electronic book of the present invention, wherein each of the electromagnetic energy changing members is a metal plate and disposed at a different corresponding position of each of the book pages, and the electromagnetic energy changing members are disposed to match with the antenna coils. An area of each of the antenna coils is equal to an area of the corresponding electromagnetic energy changing member, and a disposing position of the electromagnetic energy changing member of each of the book pages corresponds to a disposing position of each of the antenna coils of the base and reflects the magnetic flux respectively to generate the magnetic variable flux.

According to the electronic book of the present invention, wherein each of the electromagnetic energy changing members is an LC resonance module and disposed at a same corresponding position of each of the book pages. The base is provided with the single antenna coil, a disposing area of the single antenna coil is larger than an area of the electromagnetic energy changing member, a disposing position of the electromagnetic energy changing member of each of the book pages is equivalent to a disposing position of the single antenna coil of the base and absorbs the magnetic flux to generate the magnetic variable flux. Alternatively, each of the electromagnetic energy changing members is an LC resonance module and disposed at a different corresponding position of each of the book pages. The base is provided with the single antenna coil, a disposing area of the single antenna coil is larger than an accumulative area of the electromagnetic energy changing members, and a disposing position of the electromagnetic energy changing member of each of the book pages is equivalent to a disposing position of the single antenna coil of the base and absorbs the magnetic flux to generate the magnetic variable flux.

According to the electronic book of the present invention, wherein each of the electromagnetic energy changing members is an LC resonance module and disposed at a different corresponding position of each of the book pages, and the electromagnetic energy changing members are disposed to match with the antenna coils. An area of each of the antenna coils is equal to an area of the corresponding electromagnetic energy changing member, and a disposing position of the electromagnetic energy changing member of each of the book pages corresponds to a disposing position of each of the antenna coils of the base and absorbs the magnetic flux respectively to generate the magnetic variable flux.

DETAILED DESCRIPTION OF THE INVENTION

The above object of the present invention, as well as its structural and functional features, will be described in accordance with the preferred embodiments of the accompanying drawings.

Figure 1:
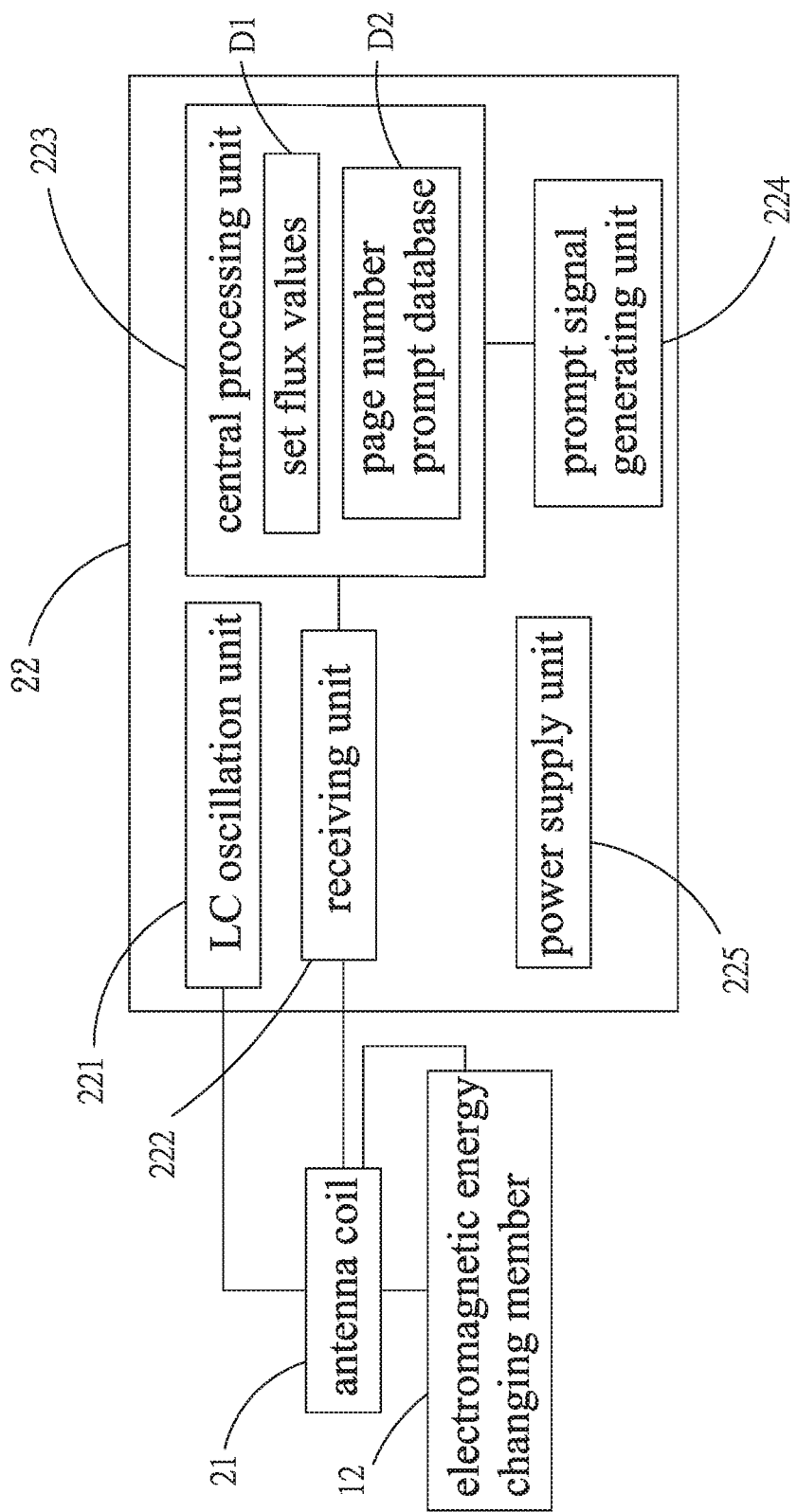
FIG. 1 is a first block diagram of the present invention.
Figure 2:
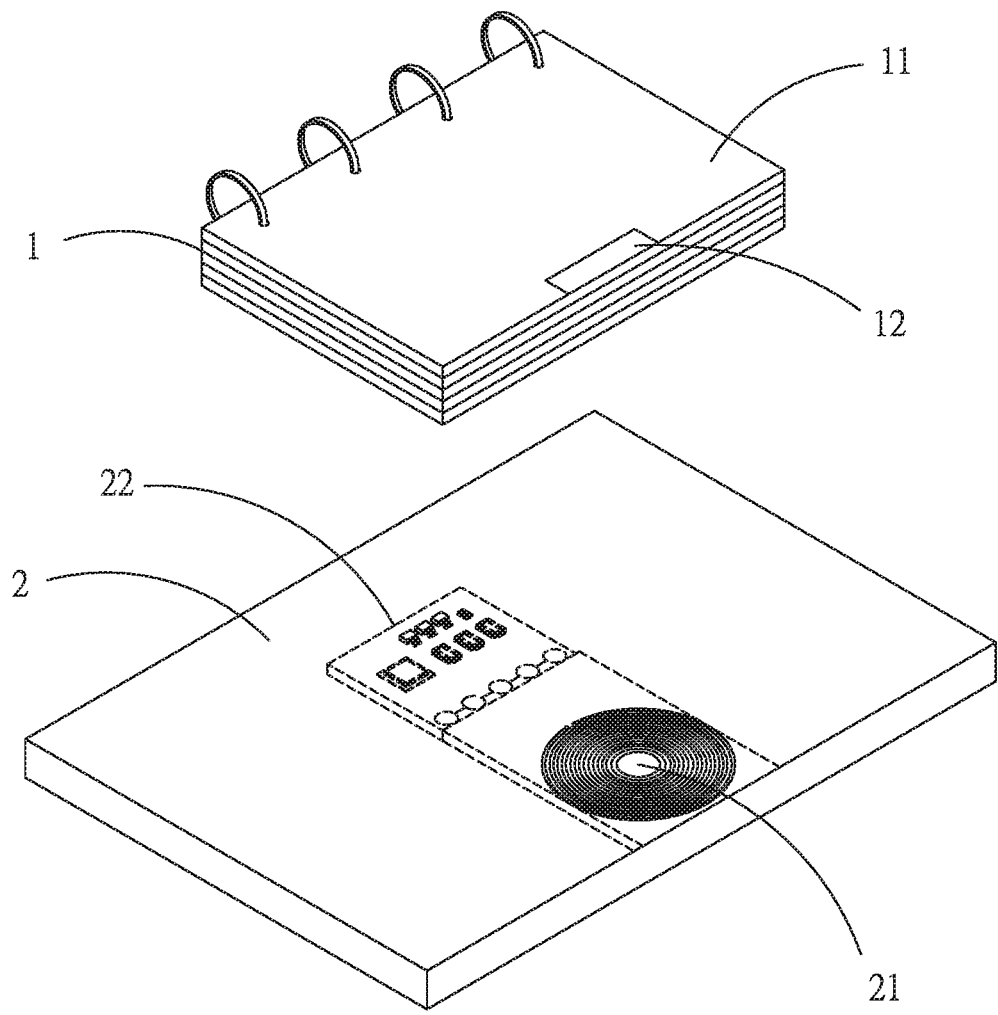
FIG. 2 is a first perspective view of the present invention.

Please refer to FIG. 1 and FIG. 2 for a first block diagram and a first perspective view of an electronic book using electromagnetic energy to detect page numbers of the present invention. It can be clearly seen from the figures that the electronic book using electromagnetic energy to detect page numbers includes a book 1 and a base 2, wherein the book 1 includes a plurality of book pages 11, but it is not limited thereto, and can also be formed by connecting a plurality of cards or book pages. Each of the book pages 11 has a pattern of the book page 11 and is respectively disposed with an electromagnetic energy changing member 12. In this embodiment, wherein the electromagnetic energy changing member 12 is a metal plate, and a material of the metal plate is copper, gold, silver, aluminum, or other suitable metal materials. The electromagnetic energy changing member 12 can be attached to a surface of the book page 11 or embedded in the book page 11, each of the electromagnetic energy changing members 12 is disposed at a same corresponding position of each of the book pages 11, that is, when the book pages 11 are unturned and attached to each other, the electromagnetic energy changing members 12 are stacked on each other.

The base 2 has an antenna coil 21 and a control circuit 22, the base 2 is implemented by using a plastic plate or other insulating bases, the antenna coil 21 is capable of transmitting and receiving magnetic flux, the antenna coil 21 can be disposed on a surface of the base 2 or embedded in the base 2, and the disposition mode is mainly to stably transmit and receive magnetic flux. In this embodiment, the antenna coil 21 is disposed on the surface of the base 2 and electrically connected to the control circuit 22. The control circuit 22 has an LC oscillation unit 221, a receiving unit 222, a central processing unit 223, a prompt signal generating unit 224 and a power supply unit 225, wherein the LC oscillation unit 221 is electrically connected to the antenna coil 21 and the receiving unit 222, the receiving unit 222 is electrically connected to the central processing unit 223, and the central processing unit 223 is electrically connected to the prompt signal generating unit 224, wherein the prompt signal generating unit 224 can be an audio generating unit, but is not limited thereto, and the prompt signal generating unit 224 can also be a light signal generating unit or a mechanism actuation signal generating unit or an image signal generating unit. When the prompt signal generating unit 224 reacts to light or mechanism actuation or image to generate a signal, each of the book pages 11 of the book 1 is provided with a corresponding light generating member or a mechanism actuating member or an image displaying member. The image displaying member can be a seven-segment display or a liquid crystal panel. In this embodiment, the prompt signal generating unit 224 is implemented as a speaker. The central processing unit 223 stores a plurality of set flux values D1 and a page number prompt database D2, the page number prompt database D2 has a plurality of page number prompt data, and the power supply unit 225 supplies an operating power for the control circuit 22.

Figure 3:
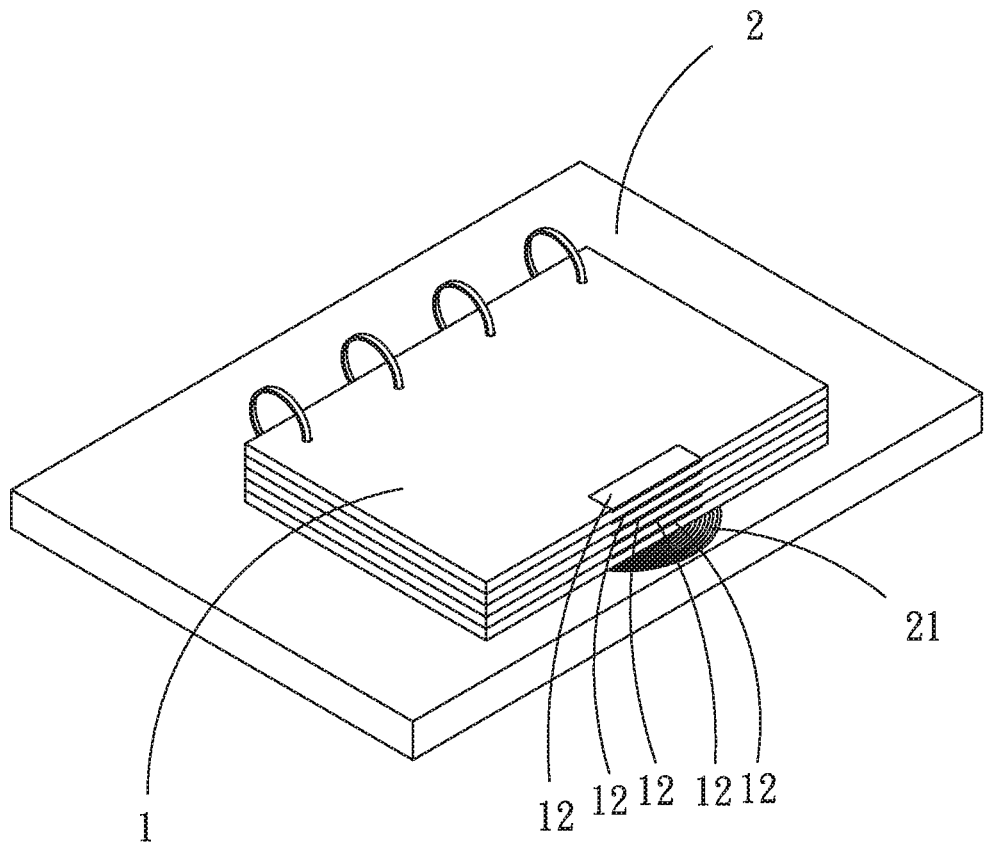
FIG. 3 is a first perspective view of a first embodiment of the present invention.
Figure 4:
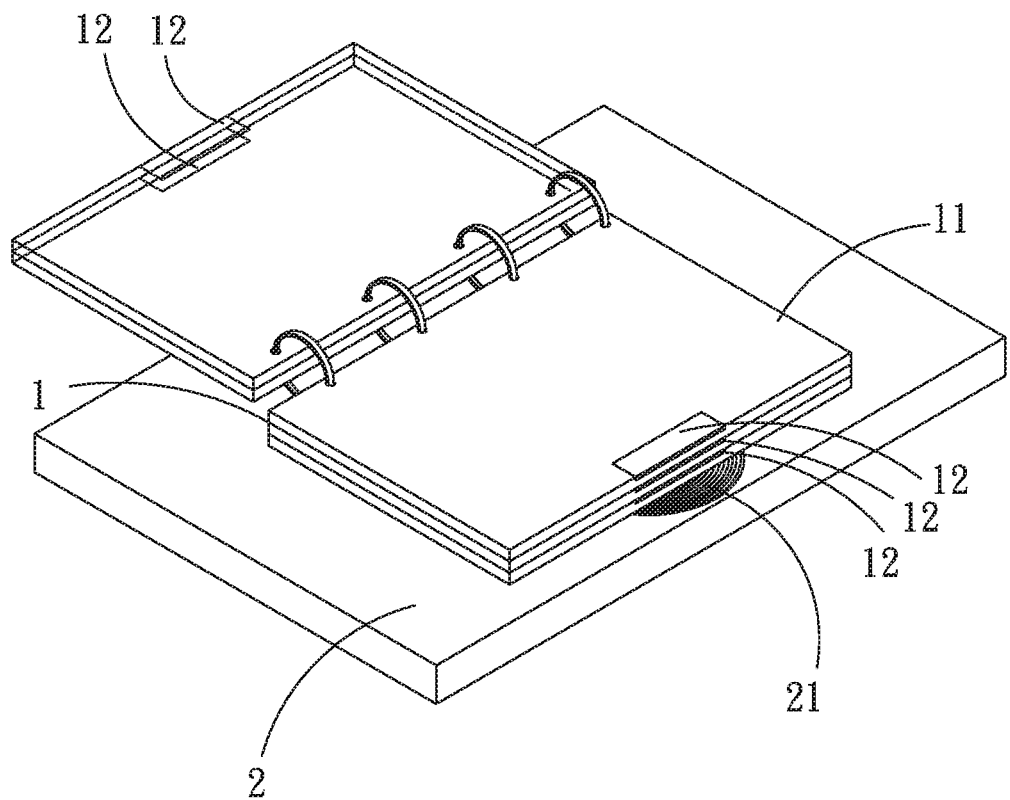
FIG. 4 is a second perspective view of the first embodiment of the present invention.
Figure 5:
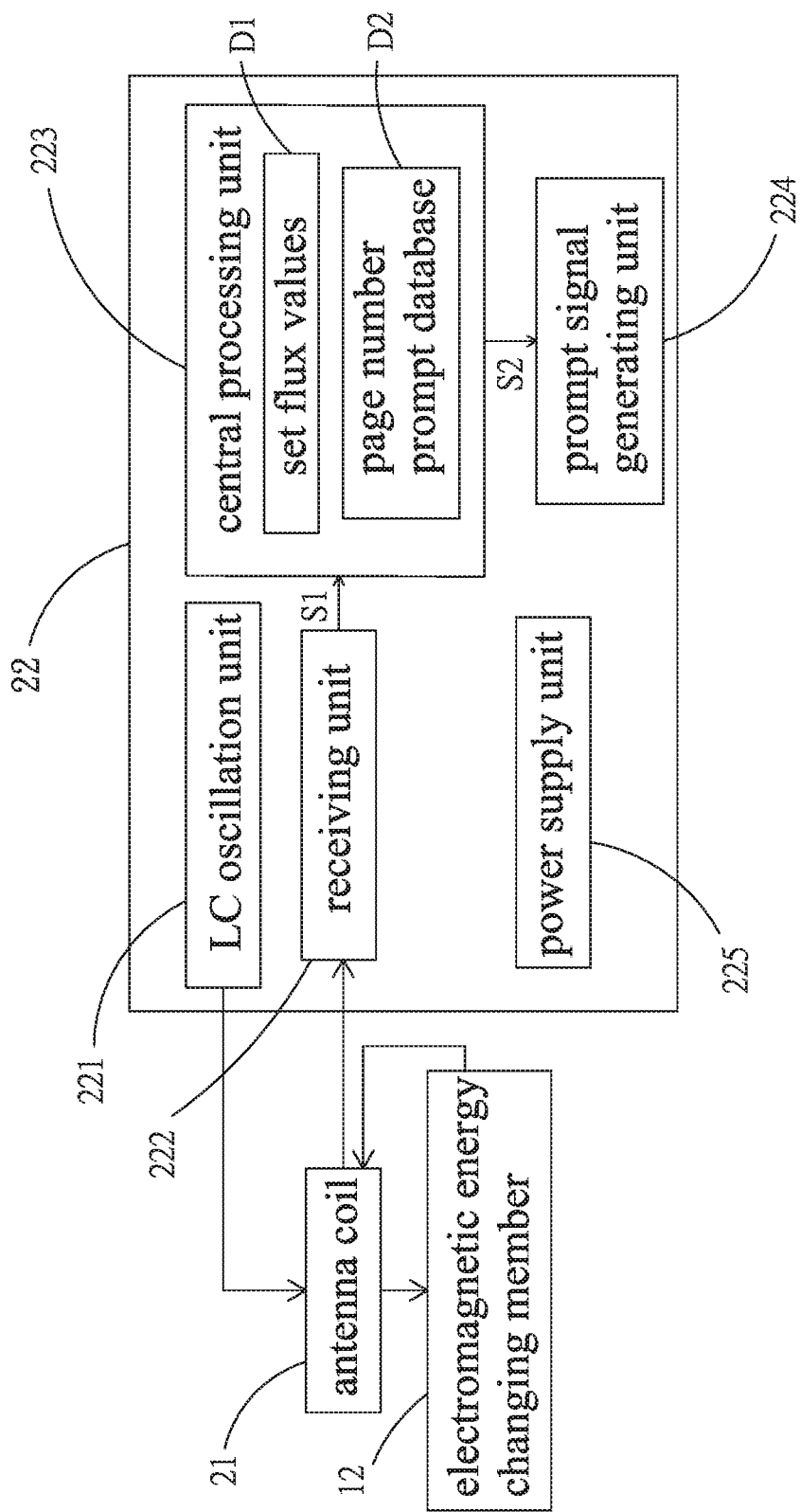
FIG. 5 is a second block diagram of the present invention.

Please refer to the foregoing figures and FIGS. 3, 4 and 5 for a first perspective view of a first embodiment, a second perspective view of the first embodiment and a second block diagram of the present invention. Wherein when the base 2 is supplied with electric power by the power supply unit 225, the LC oscillation unit 221 resonates and causes the antenna coil 21 to generate a magnetic flux, and the magnetic flux generated by the antenna coil 21 is transmitted to the electromagnetic energy changing members 12 of the book 1. Wherein the electromagnetic energy changing member 12 of each of the book pages 11 is correspondingly disposed adjacent to a position of the antenna coil 21, an optimal disposing position of the electromagnetic energy changing member 12 is above the antenna coil 21, and the electromagnetic energy changing member 12 of each of the book pages 11 reflects a corresponding magnetic flux according to a quantity of the stacked electromagnetic energy changing members 12 and generates a magnetic variable flux. The reflected magnetic variable fluxes will be received by the antenna coil 21, the antenna coil 21 receives the reflected magnetic variable fluxes and transmits the reflected magnetic variable fluxes to the receiving unit 222, the receiving unit 222 receives the magnetic variable fluxes, decodes and converts the magnetic variable fluxes into a magnetic induction signal S1, and the receiving unit 222 transmits the magnetic induction signal S1 to the central processing unit 223. After receiving the magnetic induction signal S1, the central processing unit 223 analyzes the magnetic variable fluxes and compares with the stored set flux values D1 according to the magnetic variable fluxes, wherein the set flux values D1 are set mainly based on the magnetic variable fluxes of the electromagnetic energy changing members 12. Although superposition of the electromagnetic energy changing members 12 can increase the magnetic variable fluxes, the magnetic variable fluxes will not be multiplied due to a thickness of each of the book pages 11 or a distance between the electromagnetic energy changing members 12, so the setting method is as follows, if the book 1 has five book pages 11, and the electromagnetic energy changing members 12 of the book pages 11 are stacked on each other, the magnetic variable flux reflected by the bottom electromagnetic energy changing member 12 is 100, and the magnetic variable fluxes reflected by the electromagnetic energy changing members 12 are respectively 85, 60, 35, 10 upward sequentially. The set flux values D1 in the central processing unit 223 are set based on the magnetic variable fluxes of 100, 85, 60, 35, 10, and the set flux values D1 are used to set the page number prompt data of the page number prompt database D2.

Therefore, if the book 1 is unturned, the receiving unit 222 receives the magnetic variable fluxes, decodes and converts the magnetic variable fluxes into the magnetic induction signal S1, and the receiving unit 222 transmits the magnetic induction signal S1 to the central processing unit 223. After receiving the magnetic induction signal S1, the central processing unit 223 analyzes the magnetic variable fluxes of 290 (100+85+60+35+10), and the central processing unit 223 compares with the stored set flux values D1 according to the analyzed magnetic variable fluxes, and then compares the set flux values D1 with the corresponding page number prompt data. The central processing unit 223 generates a page number prompt output command S2 and transmits the page number prompt output command S2 to the prompt signal generating unit 224 after the comparison is complete, and the prompt signal generating unit 224 generates the page number prompt data of the book page 11 correspondingly disposed adjacent to the position of the antenna coil 21 according to the page number prompt output command S2, that is, the prompt signal generating unit 224 generates the page number prompt data of the first book page 11. Conversely, if the book 1 is disposed on the base 2 and two book pages 11 are turned so that the third book page 11 is the top page, the receiving unit 222 receives the magnetic variable fluxes, decodes and converts the magnetic variable fluxes into the magnetic induction signal S1, and the receiving unit 222 transmits the magnetic induction signal S1 to the central processing unit 223. After receiving the magnetic induction signal S1, the central processing unit 223 analyzes the magnetic variable fluxes of 245 (100+85+60), and the central processing unit 223 compares with the stored set flux values D1 according to the analyzed magnetic variable fluxes, and then compares the set flux values D1 with the corresponding page number prompt data. The central processing unit 223 generates the page number prompt output command S2 and transmits the page number prompt output command S2 to the prompt signal generating unit 224 after the comparison is complete, and the prompt signal generating unit 224 generates the page number prompt data of the book page 11 correspondingly disposed adjacent to the position of the antenna coil 21 according to the page number prompt output command S2, that is, the prompt signal generating unit 224 generates the page number prompt data of the third book page 11, and then the central processing unit 223 is capable of determining the page number of the turned book page 11 of the book 1 according to the magnetic variable fluxes reflected and accumulated by the electromagnetic energy changing members 12. Because the base 2 can be affected by items in the surrounding to cause abnormal magnetic variable flux and malfunction of the prompt signal generating unit 224, the magnetic variable fluxes analyzed by the central processing unit 223 need to match the stored set flux values D1 before the page number prompt output command S2 is generated; and also the prompt signal generating unit 224 does not generate the error page number prompt data when the analyzed magnetic variable fluxes are between the two set flux values D1. The central processing unit 223 also sets positive and negative error values (%) according to the set flux values D1, so that the magnetic variable fluxes analyzed by the central processing unit 223 and the stored set flux values D1 need to fall between the positive and negative error values (%) before the page number prompt output command S2 is generated.

Figure 6:
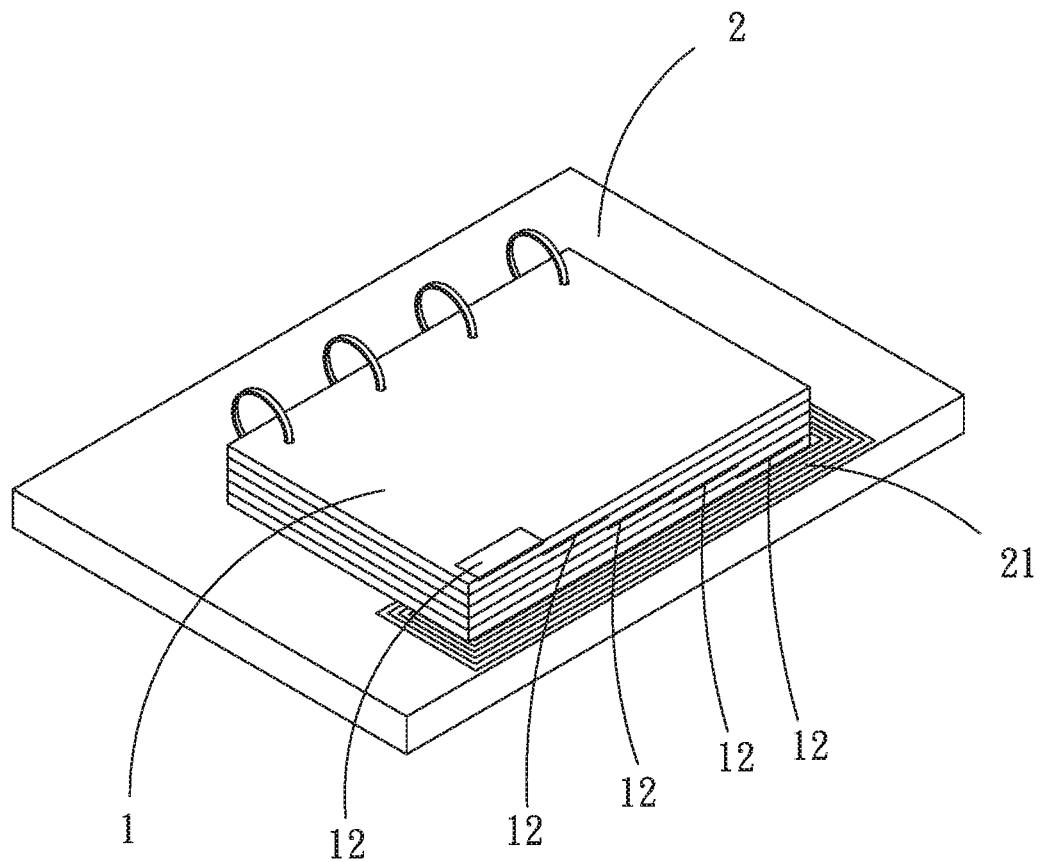
FIG. 6 is a second perspective view of the present invention.
Figure 7:
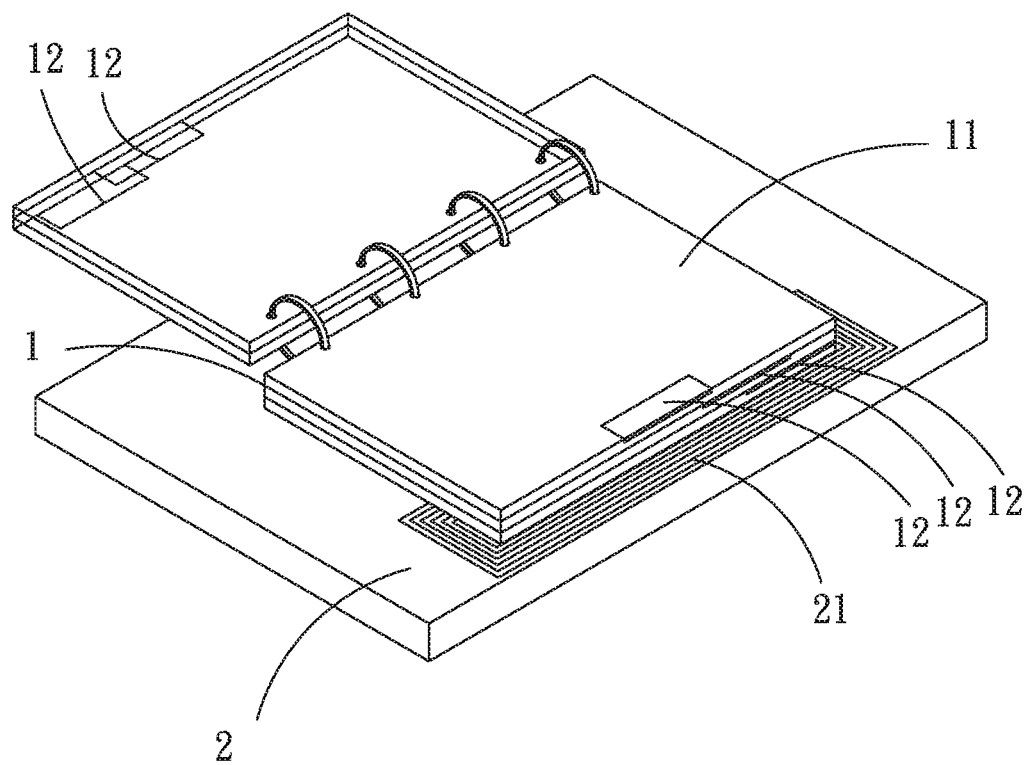
FIG. 7 is a perspective view of a second embodiment of the present invention.

Please refer to the aforementioned figures and FIG. 6 and FIG. 7 for a second perspective view and a perspective view of a second embodiment of the present invention. In this embodiment, the main difference from the foregoing is that each of the electromagnetic energy changing members 12 is disposed at a different corresponding position of each of the book pages 11, that is, when the book pages 11 are unturned and attached to each other, the electromagnetic energy changing members 12 are not stacked on each other, a disposing area of the antenna coil 21 of the base 2 needs to be increased, and the magnetic flux generated by the antenna coil 21 can be transmitted to the electromagnetic energy changing members 12 of the book 1. Alternatively, a disposing area of the antenna coil 21 can also be increased when a quantity of the book pages 11 of the book 1 increases in order to avoid that the magnetic flux generated by the antenna coil 21 cannot be transmitted to the electromagnetic energy changing members 12 of the book 1, or the magnetic variable fluxes reflected by the electromagnetic energy changing members 12 cannot be received by the antenna coil 21. The receiving unit 222 receives the magnetic variable fluxes, decodes and converts the magnetic variable fluxes into the magnetic induction signal S1, and the receiving unit 222 transmits the magnetic induction signal S1 to the central processing unit 223. The central processing unit 223 generates the page number prompt output command S2 and transmits the page number prompt output command S2 to the prompt signal generating unit 224, the prompt signal generating unit 224 generates the page number prompt data of the book page 11 correspondingly disposed adjacent to the position of the antenna coil 21, and then the central processing unit 223 is capable of determining the page number of the turned book page 11 of the book 1 according to the magnetic variable fluxes reflected and accumulated by the electromagnetic energy changing members 12.

Figure 8:
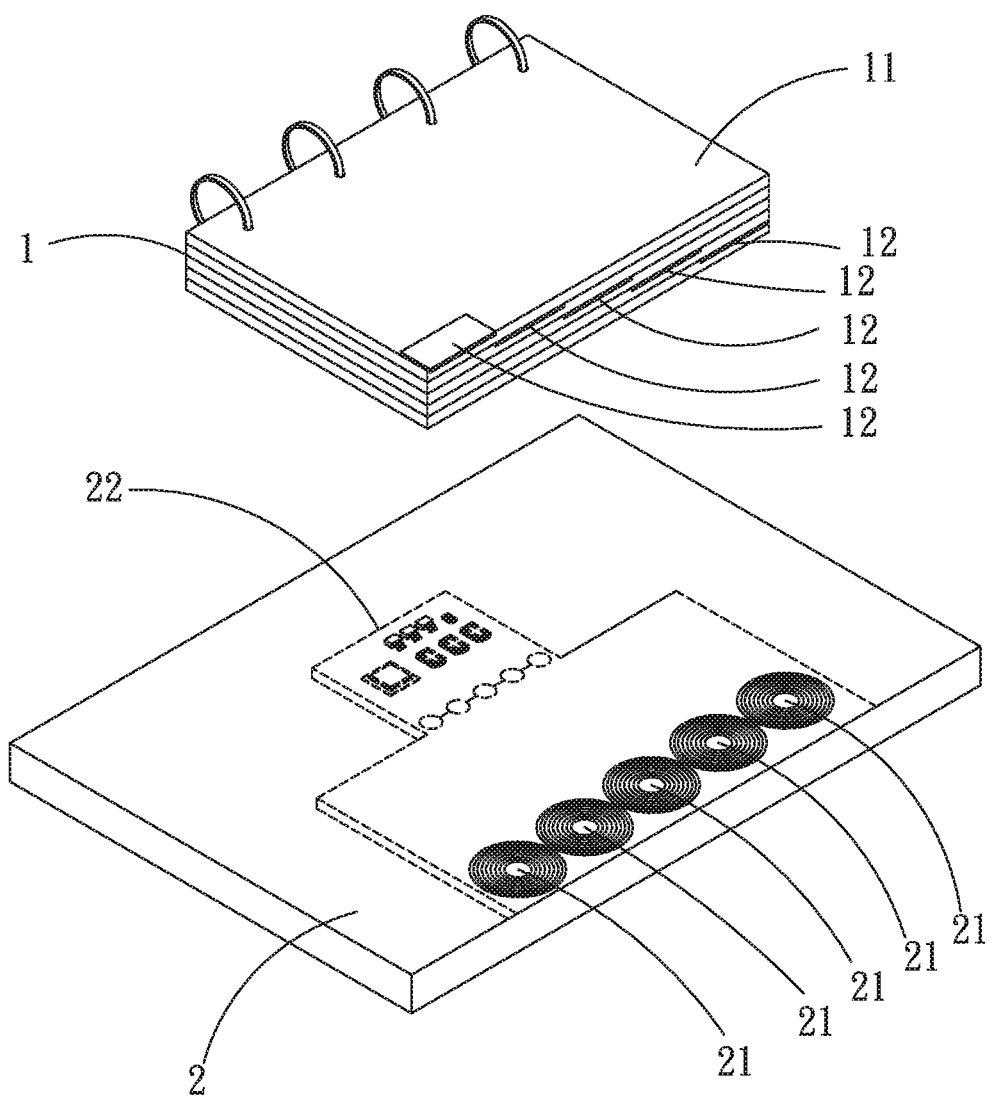
FIG. 8 is a third perspective view of the present invention.
Figure 9:
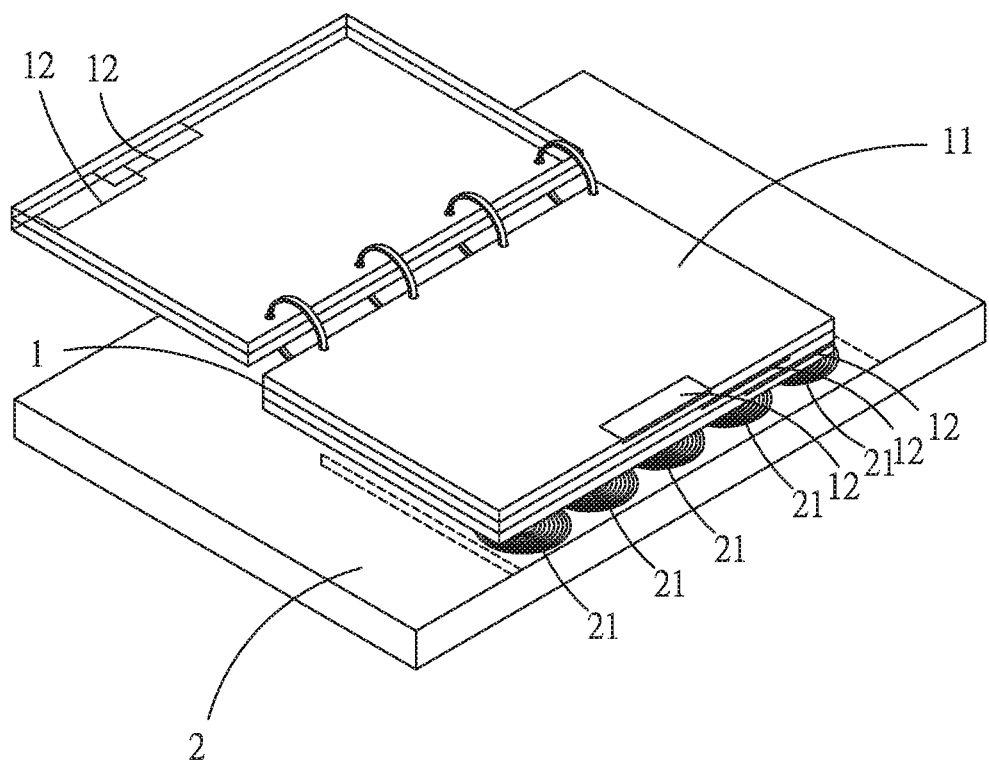
FIG. 9 is a perspective view of a third embodiment of the present invention.

Please refer to the aforementioned figures as well as FIG. 8 and FIG. 9 for a third perspective view and a perspective view of a third embodiment of the present invention. In this embodiment, the main difference from the foregoing is that each of the electromagnetic energy changing members 12 is disposed at a different corresponding position of each of the book pages 11, and the base 2 is disposed with the antenna coils 21. An area of each of the antenna coils 21 is equal to an area of the corresponding electromagnetic energy changing member 12, that is, when the book pages 11 are unturned and attached to each other, the electromagnetic energy changing members 12 are not stacked on each other, and respectively disposed adjacent to the positions of the antenna coils 21 correspondingly. The magnetic fluxes generated by the antenna coils 21 can be transmitted to the electromagnetic energy changing members 12 of the book 1, the electromagnetic energy changing members 12 reflect the magnetic fluxes and generate the magnetic variable fluxes to be received by each of the antenna coils 21, the receiving unit 222 receives the magnetic variable fluxes from each of the antenna coils 21, decodes and converts the magnetic variable fluxes into the magnetic induction signal S1, and the receiving unit 222 transmits the magnetic induction signal S1 to the central processing unit 223. Alternatively, if the book pages 11 are turned, the turned electromagnetic energy changing members 12 are not adjacent to the positions of the antenna coils 21, the magnetic fluxes generated and transmitted by the antenna coils 21 will not be reflected by the turned electromagnetic energy changing members 12, the receiving unit 222 receives the reflected magnetic variable fluxes, decodes and converts the magnetic variable fluxes into the magnetic induction signal S1, and the receiving unit 222 transmits the magnetic induction signal S1 to the central processing unit 223. The central processing unit 223 generates the page number prompt output command S2 and transmits the page number prompt output command S2 to the prompt signal generating unit 224, the prompt signal generating unit 224 generates the page number prompt data of the book page 11 disposed adjacent to the position of the antenna coil 21, and then the central processing unit 223 is capable of determining the page number of the turned book page 11 of the book 1 according to whether the electromagnetic energy changing member 12 reflects the magnetic flux.

Figure 10:
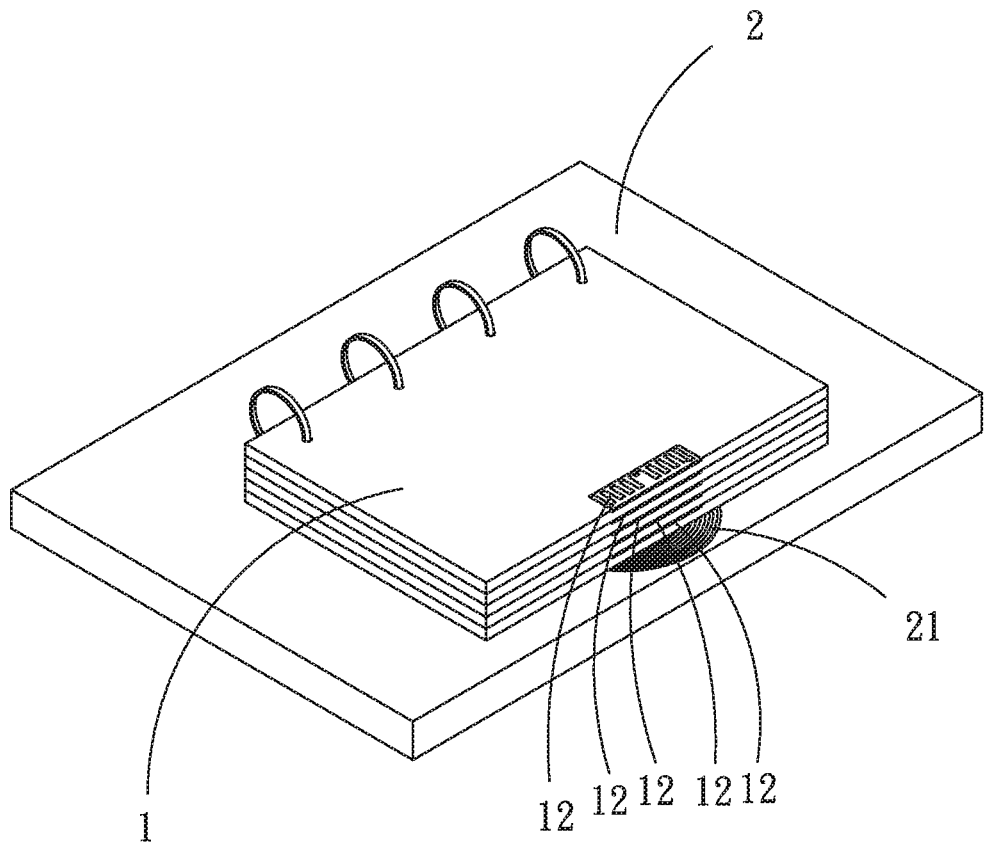
FIG. 10 is a fourth perspective view of the present invention.
Figure 11:
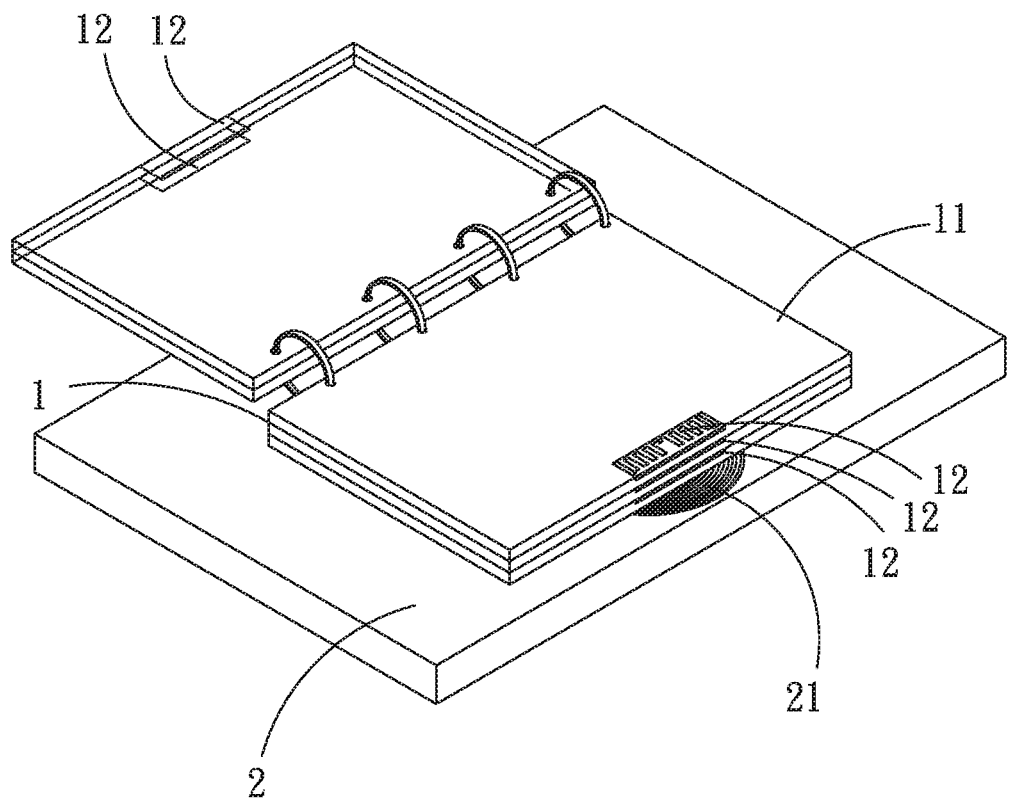
FIG. 11 is a perspective view of a fourth embodiment of the present invention.

Please refer to the aforementioned figures as well as FIG. 10 and FIG. 11 for a fourth perspective view and a perspective view of a fourth embodiment of the present invention. In this embodiment, the main difference from the foregoing is that the electromagnetic energy changing member 12 is an LC resonance module, the LC resonance module is a resonance circuit module including an inductor and a capacitor, and the electromagnetic energy changing members 12 can be attached to the surfaces of the book pages 11 or embedded in the book pages 11 respectively. Each of the electromagnetic energy changing members 12 is disposed at a same corresponding position of each of the book pages 11, that is, when the book pages 11 are unturned and attached to each other, the electromagnetic energy changing members 12 are stacked on each other. The base 2 is provided with the single antenna coil 21, a disposing area of the single antenna coil 21 is larger than an area of the electromagnetic energy changing member 12, when the book 1 is placed on the base 2 and supplied with electric power by the power supply unit 225, the LC oscillation unit 221 resonates and causes the antenna coil 21 to generate a magnetic flux, and the magnetic flux generated by the antenna coil 21 is transmitted to the electromagnetic energy changing members 12 of the book 1. The electromagnetic energy changing members 12 being the LC resonance modules absorb the magnetic flux and generate the magnetic variable fluxes, and the antenna coil 21 receives the remaining magnetic variable fluxes after absorption and transmits the magnetic variable fluxes to the receiving unit 222. The receiving unit 222 receives the magnetic variable fluxes, decodes and converts the magnetic variable fluxes into the magnetic induction signal S1, and the receiving unit 222 transmits the magnetic induction signal S1 to the central processing unit 223. The central processing unit 223 generates the page number prompt output command S2 and transmits the page number prompt output command S2 to the prompt signal generating unit 224, the prompt signal generating unit 224 generates the page number prompt data of the book page 11 disposed adjacent to the position of the antenna coil 21, and then the central processing unit 223 is capable of determining the page number of the turned book page 11 of the book 1 according to the magnetic variable fluxes absorbed and accumulated by the electromagnetic energy changing members 12.

Figure 12:
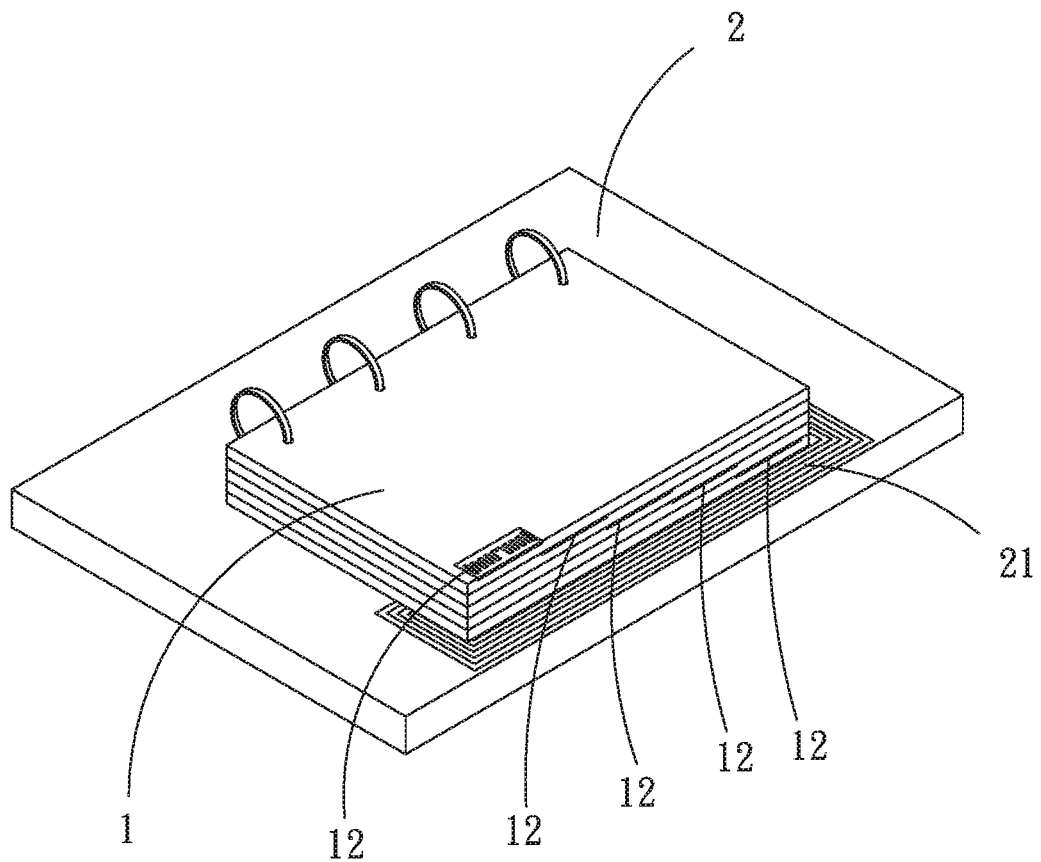
FIG. 12 is a fifth perspective view of the present invention.
Figure 13:
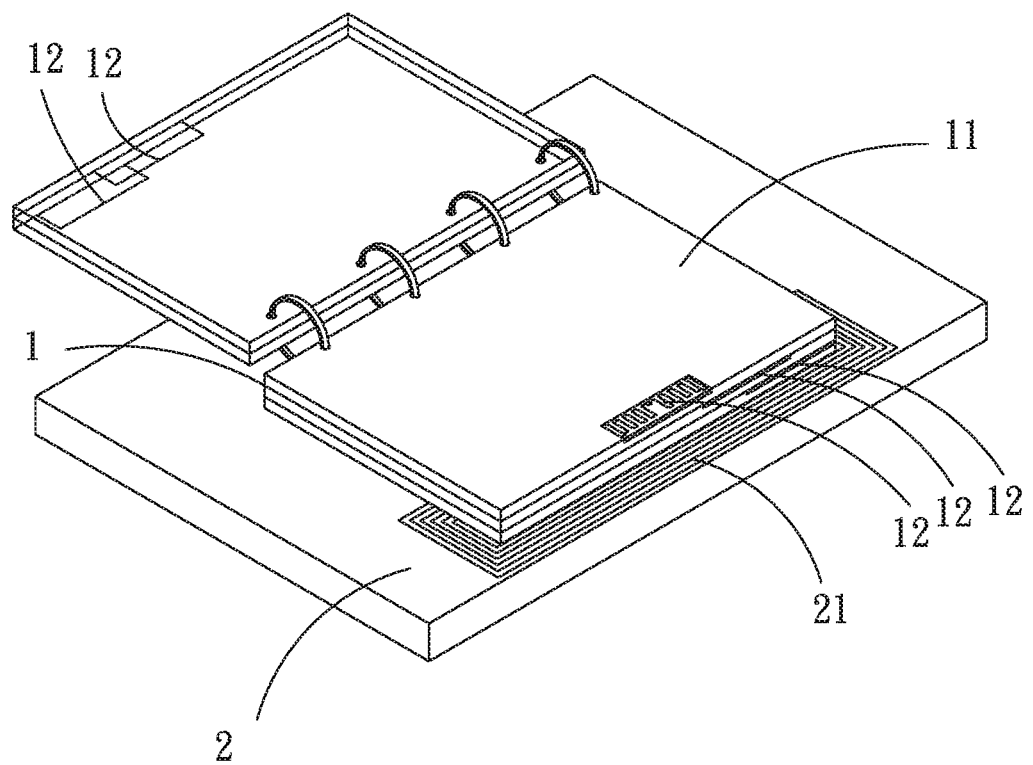
FIG. 13 is a perspective view of a fifth embodiment of the present invention.

Please refer to the aforementioned figures as well as FIG. 12 and FIG. 13 for a fifth perspective view and a perspective view of a fifth embodiment of the present invention. In this embodiment, the main difference from the foregoing is that the electromagnetic energy changing member 12 is an LC resonance module, each of the electromagnetic energy changing members 12 is disposed at a different corresponding position of each of the book pages 11, that is, when the book pages 11 are unturned and attached to each other, the electromagnetic energy changing members 12 are not stacked on each other. The base 2 is provided with the single antenna coil 21, a disposing area of the single antenna coil 21 is larger than an accumulative area of the electromagnetic energy changing members 12, when the book 1 is placed on the base 2 and supplied with electric power by the power supply unit 225, the LC oscillation unit 221 resonates and causes the antenna coil 21 to generate a magnetic flux, and the magnetic flux generated by the antenna coil 21 is transmitted to the electromagnetic energy changing members 12 of the book 1. The electromagnetic energy changing members 12 being the LC resonance modules absorb the magnetic flux and generate the magnetic variable fluxes, and the antenna coil 21 receives the remaining magnetic variable fluxes after absorption and transmits the magnetic variable fluxes to the receiving unit 222. The receiving unit 222 receives the magnetic variable fluxes, decodes and converts the magnetic variable fluxes into the magnetic induction signal S1, and the receiving unit 222 transmits the magnetic induction signal S1 to the central processing unit 223. The central processing unit 223 generates the page number prompt output command S2 and transmits the page number prompt output command S2 to the prompt signal generating unit 224, the prompt signal generating unit 224 generates the page number prompt data of the book page 11 disposed adjacent to the position of the antenna coil 21, and then the central processing unit 223 is capable of determining the page number of the turned book page 11 of the book 1 according to the magnetic variable fluxes absorbed and accumulated by the electromagnetic energy changing members 12.

Figure 14:
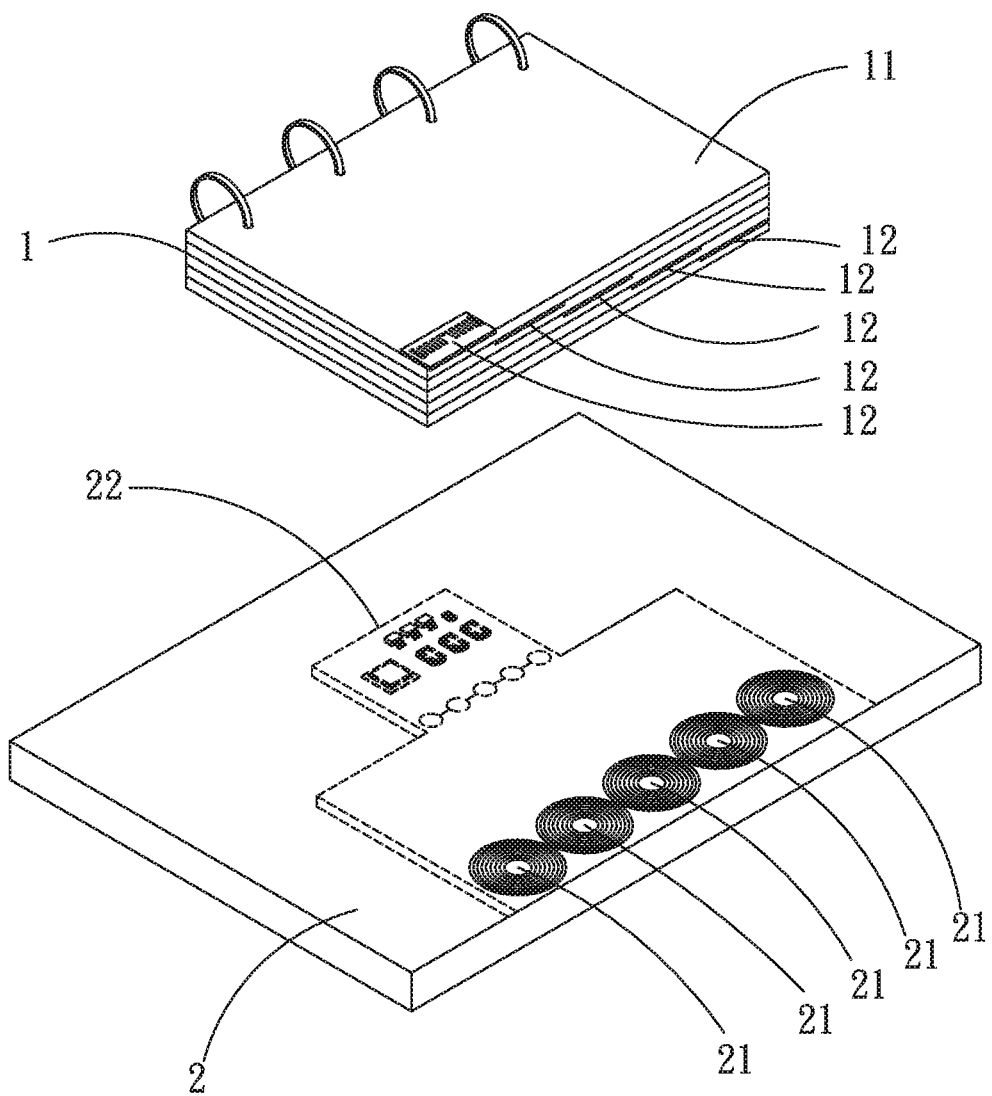
FIG. 14 is a sixth perspective view of the present invention.
Figure 15:
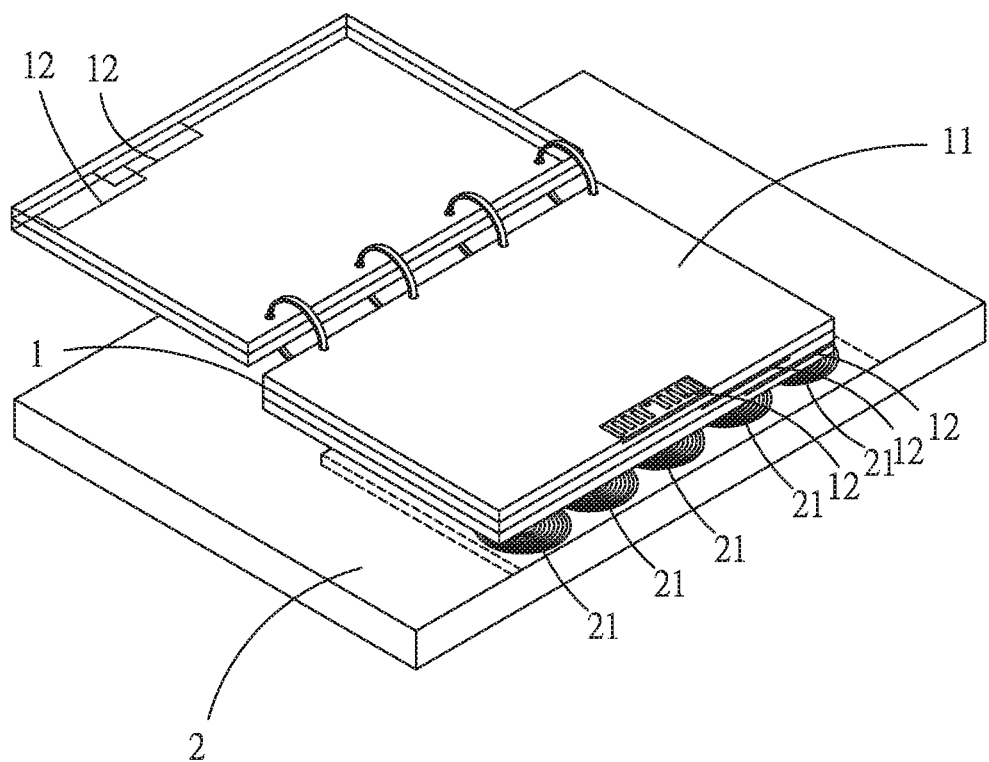
FIG. 15 is a perspective view of a sixth embodiment of the present invention.

Please refer to the aforementioned figures as well as FIG. 14 and FIG. 15 for a sixth perspective view and a perspective view of a sixth embodiment of the present invention. In this embodiment, the main difference from the foregoing is that the electromagnetic energy changing member 12 is an LC resonance module, each of the electromagnetic energy changing members 12 is disposed at a different corresponding position of each of the book pages 11, and the base 2 is disposed with the antenna coils 21. An area of each of the antenna coils 21 is equal to an area of the corresponding electromagnetic energy changing member 12, that is, when the book pages 11 are unturned and attached to each other, the electromagnetic energy changing members 12 are not stacked on each other, and respectively disposed adjacent to the positions of the antenna coils 21 correspondingly. The magnetic fluxes generated by the antenna coils 21 can be transmitted to the electromagnetic energy changing members 12 of the book 1, the electromagnetic energy changing members 12 absorb the magnetic fluxes and generate the magnetic variable fluxes to be received by each of the antenna coils 21, the receiving unit 222 receives the magnetic variable fluxes from each of the antenna coils 21, decodes and converts the magnetic variable fluxes into the magnetic induction signal S1, and the receiving unit 222 transmits the magnetic induction signal S1 to the central processing unit 223. Alternatively, if the book pages 11 are turned, the turned electromagnetic energy changing members 12 are not adjacent to the positions of the antenna coils 21, the magnetic fluxes generated and transmitted by the antenna coils 21 will not be absorbed by the turned electromagnetic energy changing members 12, the receiving unit 222 receives the absorbed magnetic variable fluxes, decodes and converts the magnetic variable fluxes into the magnetic induction signal S1, and the receiving unit 222 transmits the magnetic induction signal S1 to the central processing unit 223. The central processing unit 223 generates the page number prompt output command S2 and transmits the page number prompt output command S2 to the prompt signal generating unit 224, the prompt signal generating unit 224 generates the page number prompt data of the book page 11 disposed adjacent to the position of the antenna coil 21, and then the central processing unit 223 is capable of determining the page number of the turned book page 11 of the book 1 according to whether the electromagnetic energy changing member 12 absorbs the magnetic flux.

Figure 16:
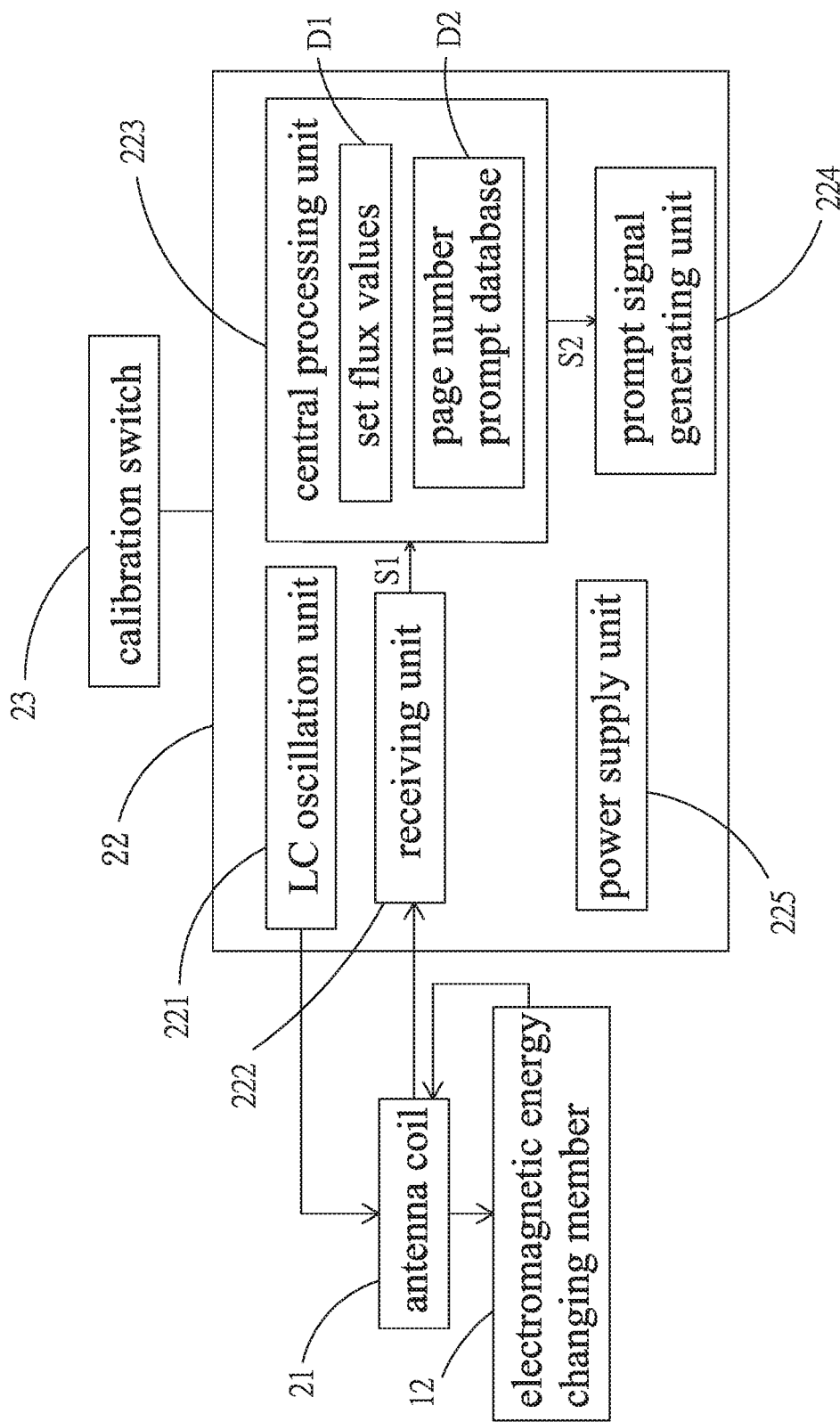
FIG. 16 is a third block diagram of the present invention.

Please refer to FIG. 16 for a third block diagram of the present invention. In this embodiment, the main difference from the foregoing is that the electronic book will have changes in temperature, pressure or humidity when using in different environments. Therefore, the base 2 is further provided with a calibration switch 23. The calibration switch 23 can be an automatic calibration or a manual calibration. Wherein the manual calibration can be a reset switch, and the automatic calibration can be a photoelectric switch, a magnet switch, a pressure switch or a mechanism switch. In this embodiment, the automatic calibration is implemented by a photoelectric switch, that is, a phototransistor is provided on the base 2, and a through hole is disposed in the phototransistor corresponding to the book pages 11. The calibration switch 23 is actuated when the last book page 11 of the book 1 is turned, and the central processing unit 223 analyzes that the magnetic variable flux is not 0; since after the last book page 11 is turned, the magnetic variable flux analyzed by the central processing unit 223 should be 0; if the magnetic variable flux is not 0, it means that the magnetic flux is affected by changes in temperature, pressure, or humidity, which means that the magnetic flux needs to be calibrated. After calibration by the calibration switch 23, it can be beneficial to have an efficacy of favorable sensing function in the subsequent page number sensing.

Figure 17:
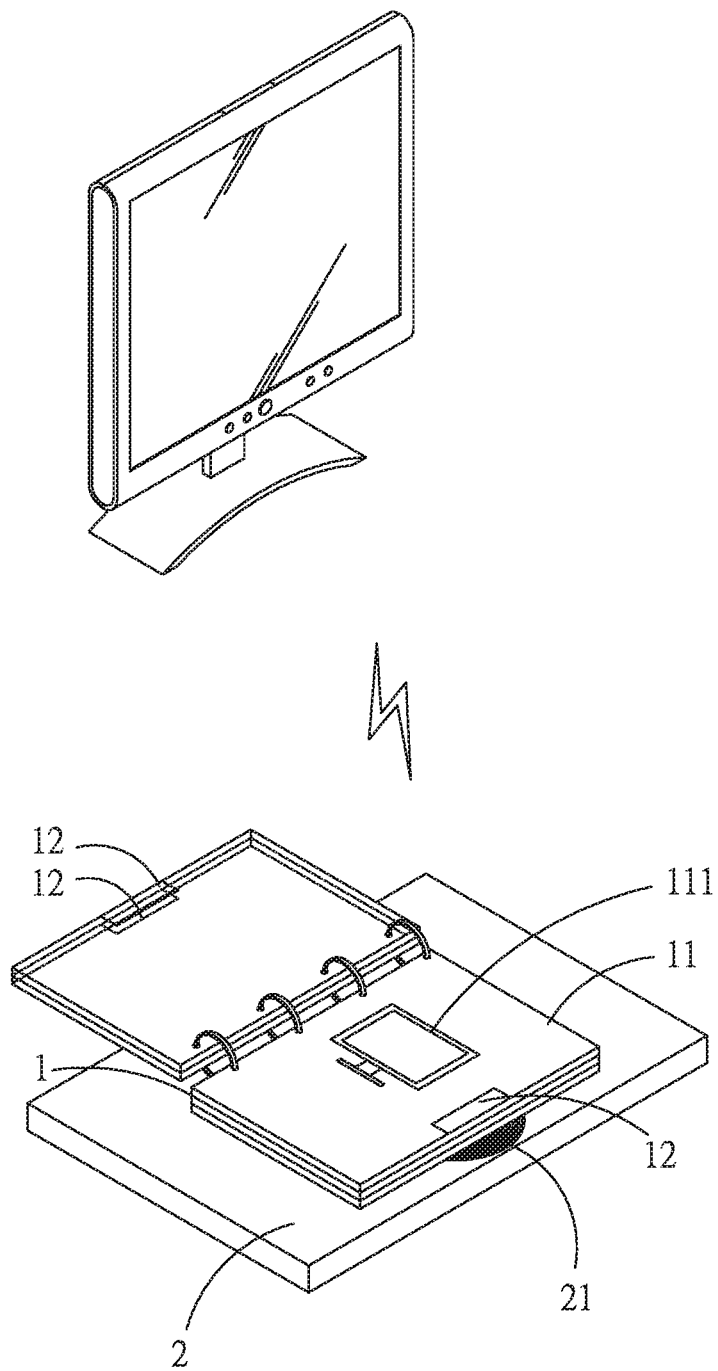
FIG. 17 is a perspective view of a further embodiment of the present invention.
Figure 18:
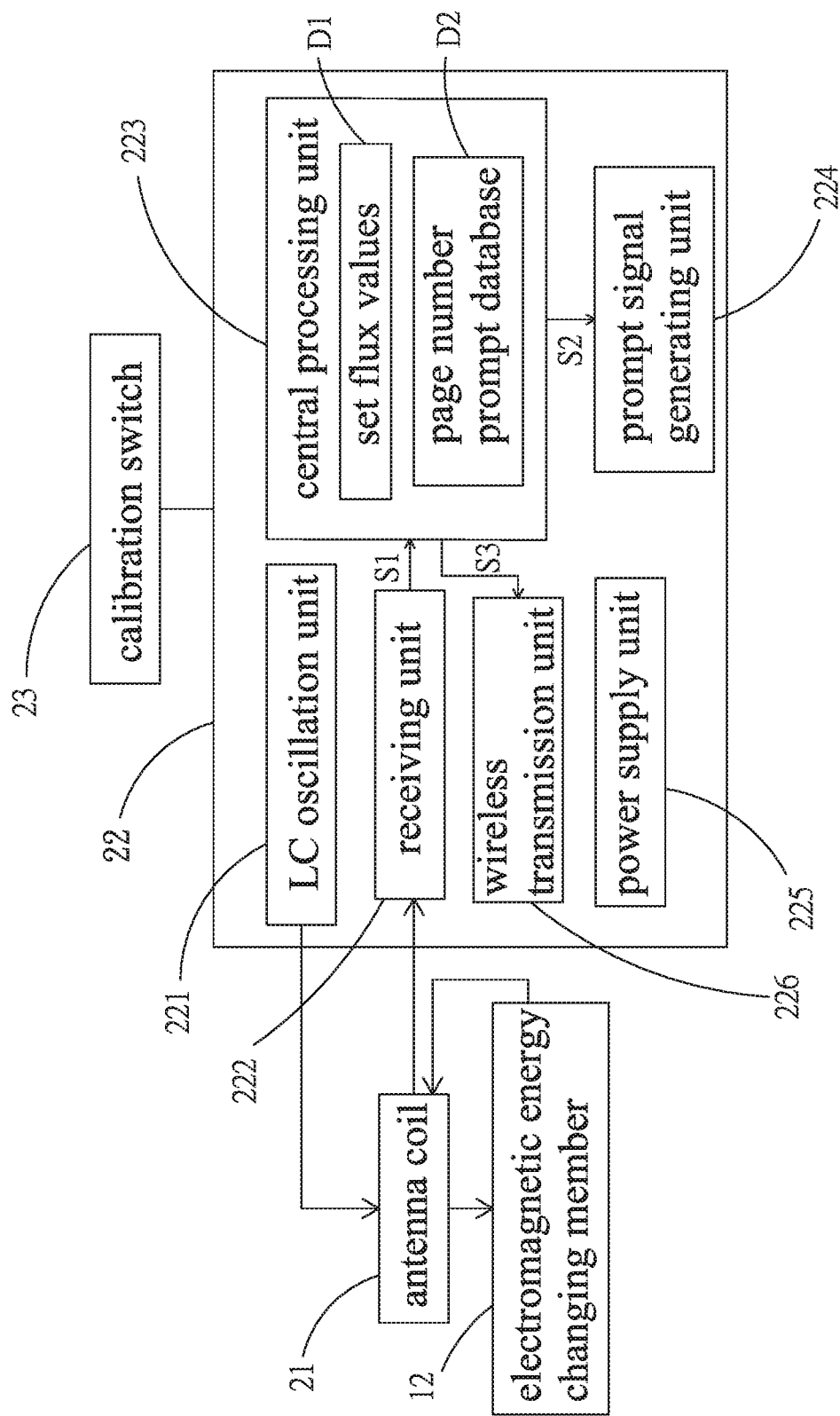
FIG. 18 is a fourth block diagram of the present invention.

Please refer to FIG. 17 and FIG. 18 for a perspective view of a further embodiment and a fourth block diagram of the present invention. In this embodiment, the main difference from the foregoing is that the control circuit 22 is further provided with a wireless transmission unit 226, and the wireless transmission unit 226 is electrically connected to the central processing unit 223. On each of the book pages 11 of the book 1 is provided with at least one pattern 111, and the patterns 111 correspond to different home appliances respectively. When the book 1 is turned to the pattern 111 such as a television, the receiving unit 222 receives the magnetic variable flux, decodes and converts the magnetic variable flux into the magnetic induction signal S1, and the receiving unit 222 transmits the magnetic induction signal S1 to the central processing unit 223. The central processing unit 223 generates a control signal S3 and transmits the control signal S3 to the wireless transmission unit 226, and the wireless transmission unit 226 converts the control signal S3 into a corresponding wireless signal and transmits the wireless signal to a corresponding home appliance and controls the home appliance to turn on or off or to perform other actions, thereby achieving an efficacy of controlling actions of the home appliance corresponding to the book page 11 through turning the book 1.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An electronic book system using electromagnetic energy to detect page numbers comprising:
    a book, the book having a plurality of book pages, and each of the book pages being provided with an electromagnetic energy changing member; and
    a base, the base having at least one antenna coil and at least one control circuit, the control circuit having an LC oscillation unit, a receiving unit, a central processing unit, a prompt signal generating unit and a power supply unit, the LC oscillation unit generating resonance to cause the antenna coil to generate a magnetic flux and to transmit the magnetic flux to the electromagnetic energy changing members disposed adjacent to a position of the antenna coil, the electromagnetic energy changing members generating magnetic variable fluxes through absorption or reflection of the magnetic flux and the magnetic variable fluxes being transmitted through the antenna coil to the receiving unit, the receiving unit receiving the magnetic variable fluxes and decoding the magnetic variable fluxes to generate a magnetic induction signal, the receiving unit transmitting the magnetic induction signal to the central processing unit, the central processing unit comparing the magnetic induction signal and converting the magnetic induction signal into a page number prompt output command to control the prompt signal generating unit to generate a prompt function of the book page correspondingly disposed adjacent to the position of the antenna coil;
    wherein the central processing unit has a plurality of set flux values, the central processing unit compares the magnetic induction signal with the set flux values to generate the page number prompt output command, and through the page number prompt output command the central processing unit controls the prompt signal generating unit to generate the prompt function of the book page correspondingly disposed adjacent to the position of the antenna coil.

2. The electronic book system as claimed in claim 1, wherein the central processing unit stores a page number prompt database, the page number prompt database has page number prompt data corresponding to each of the book pages, the central processing unit receives the magnetic induction signal while captures the page number prompt data corresponding to the book page according to the magnetic variable flux, and through the page number prompt output command the central processing unit controls the prompt signal generating unit to generate the page number prompt data of the book page correspondingly disposed adjacent to the position of the antenna coil.

3. The electronic book system as claimed in claim 1, wherein the control circuit is further provided with a wireless transmission unit, the wireless transmission unit is electrically connected to the central processing unit, and the wireless transmission unit can be various types of remote control transmitters.

4. The electronic book system as claimed in claim 1, wherein the electromagnetic energy changing member is an LC resonance module, the LC resonance module is a resonance circuit module including an inductor and a capacitor, and the electromagnetic energy changing member can be attached to the surface of the book page or embedded in the book page.

5. The electronic book system as claimed in claim 1, wherein each of the electromagnetic energy changing members is an LC resonance module and disposed at a different corresponding position of each of the book pages, the electromagnetic energy changing members are disposed to match with the antenna coils, an area of each of the antenna coils is equal to an area of the corresponding electromagnetic energy changing member, and a disposing position of the electromagnetic energy changing member of each of the book pages corresponds to a disposing position of each of the antenna coils of the base and absorbs the magnetic flux respectively to generate the magnetic variable flux.

* * * * *